No. 626,160. Patented May 30, 1899.
A. W. HAAG.
SCALPER, GRADER, PURIFIER, AND BOLTER.
(Application filed June 17, 1898.)
(No Model.) 3 Sheets—Sheet 1.
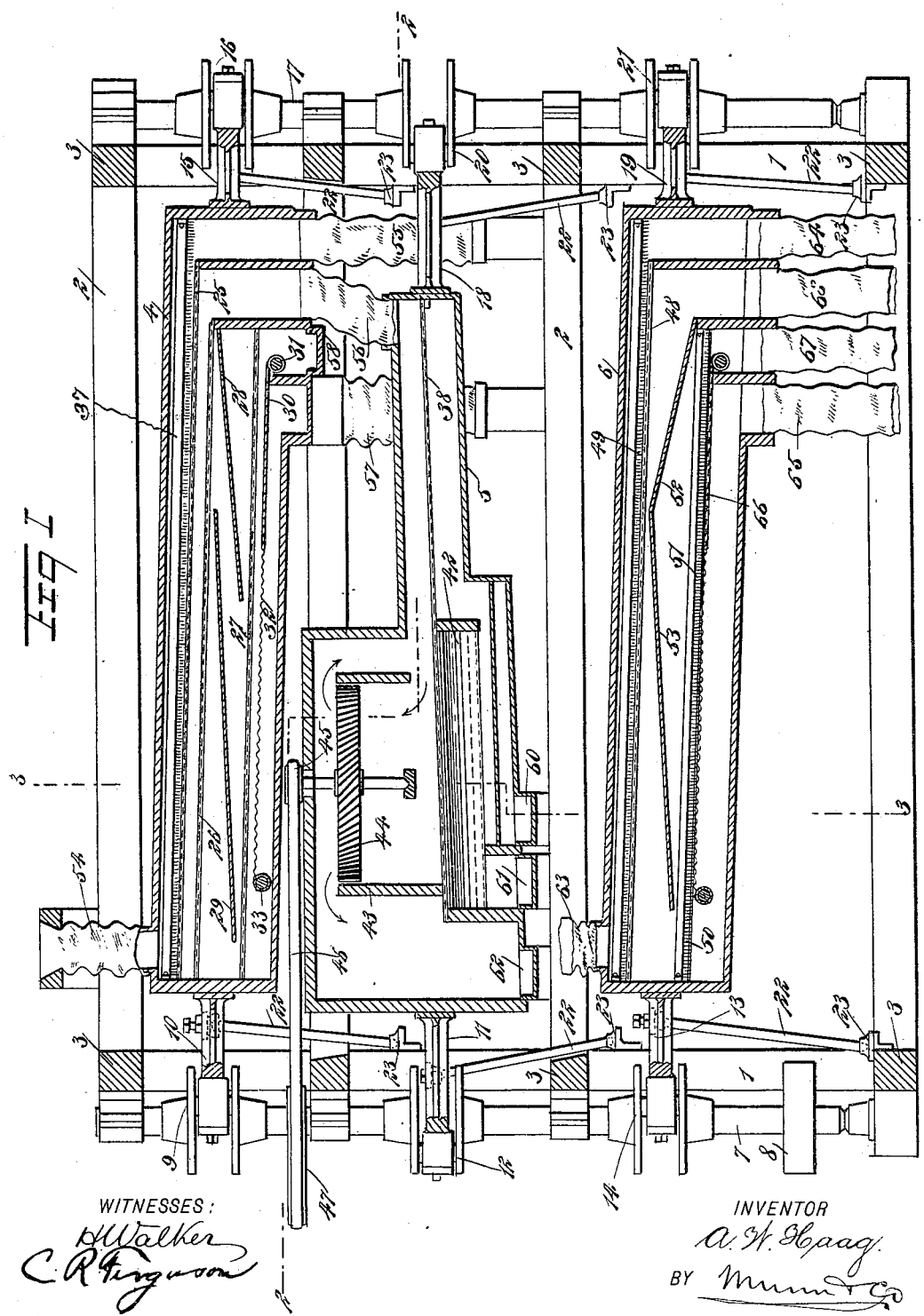
WITNESSES:
INVENTOR
A. W. Haag.
BY
ATTORNEYS.

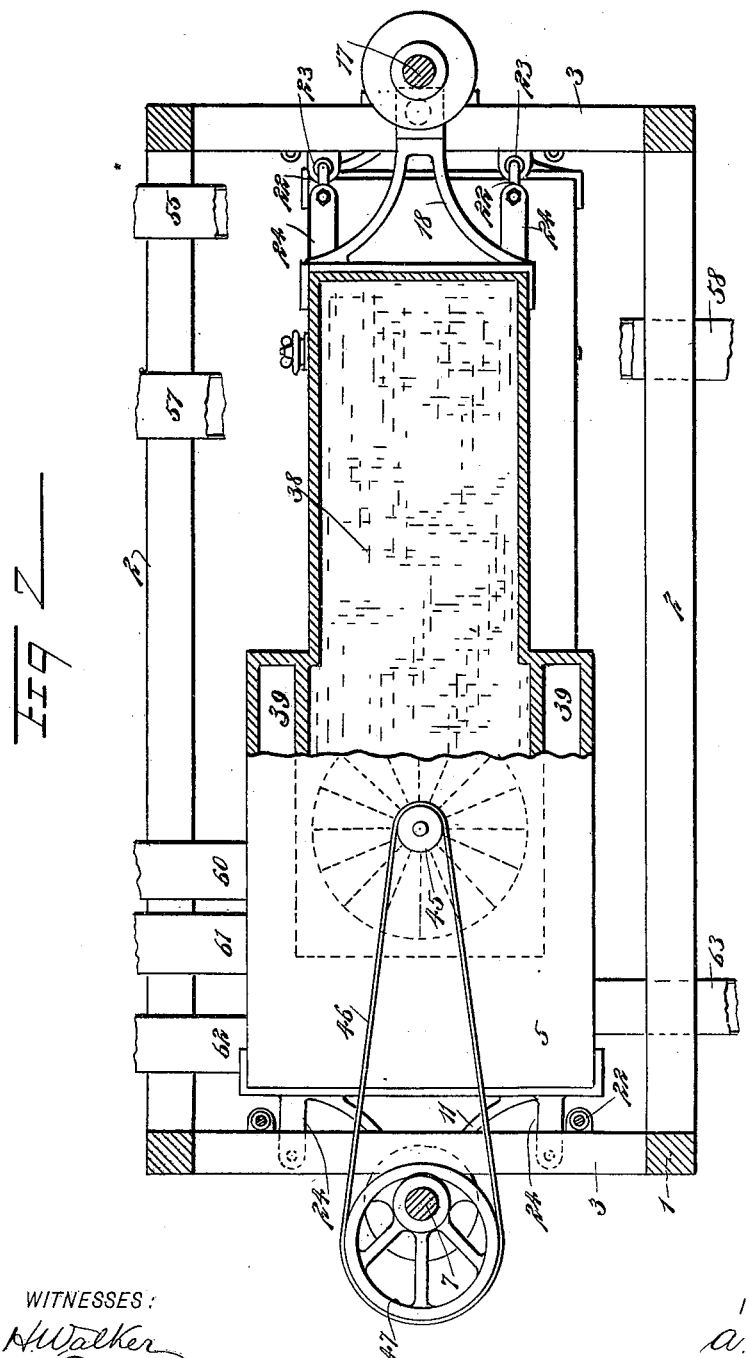

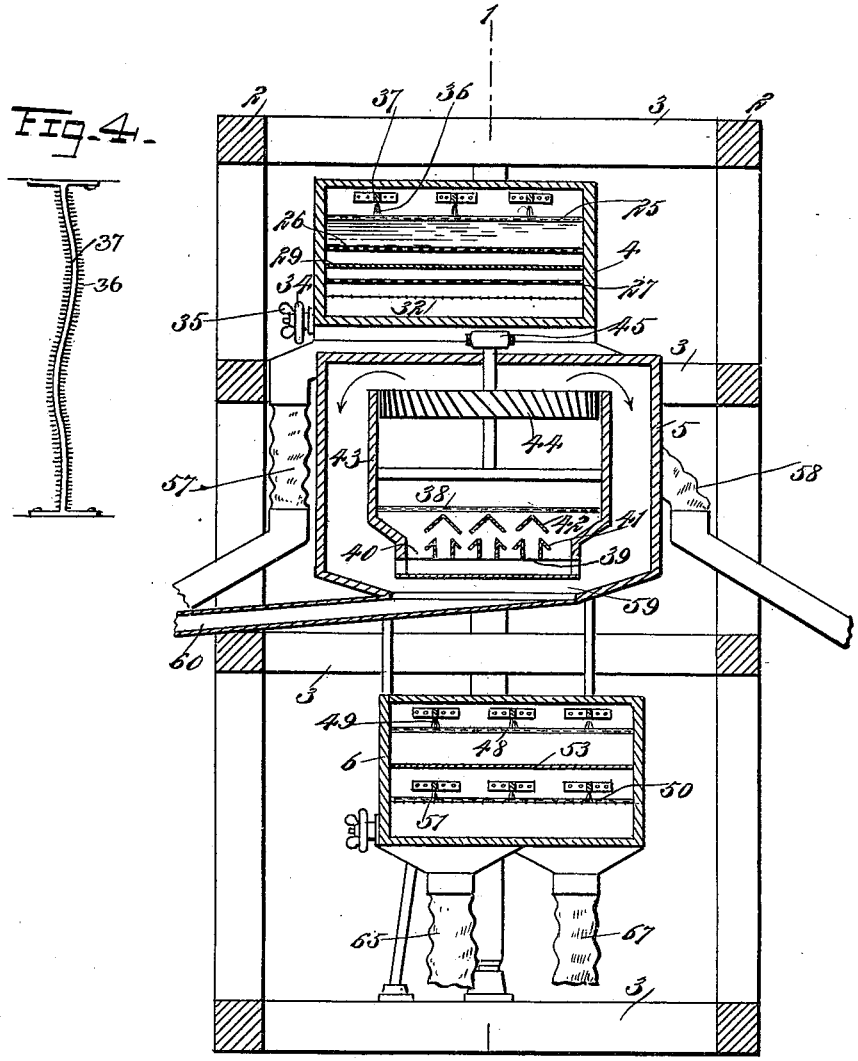

UNITED STATES PATENT OFFICE.

ADAM W. HAAG, OF READING, PENNSYLVANIA.

SCALPER, GRADER, PURIFIER, AND BOLTER.

SPECIFICATION forming part of Letters Patent No. 626,160, dated May 30, 1899.

Application filed June 17, 1898. Serial No. 683,745. (No model.)

*To all whom it may concern:*

Be it known that I, ADAM W. HAAG, of Reading, in the county of Berks and State of Pennsylvania, have invented a new and Improved Scalper, Grader, Purifier, and Bolter, of which the following is a full, clear, and exact desciption.

This invention relates to machines for scalping, grading, purifying, and bolting flour; and the object is to provide a machine of this character that shall be comparatively simple in its construction and easily operated.

I will describe a machine embodying my invention and then point out the novel features in the appended claims.

Reference is to be had to the accompanying drawings forming, a part of this specification, in which similar characters of reference indicate corresponding parts in all the views.

Figure 1 is a vertical section on the line 1 1 of Fig. 3 of a machine embodying my invention. Fig. 2 is a section on the line 2 2 of Fig. 1. Fig. 3 is a section on the line 3 3 of Fig. 1, and Fig. 4 is a detail plan showing a flexible brush-back employed.

The machine comprises a frame having corner posts or uprights 1, horizontal side beams 2, and the end cross-beams 3. Mounted in the upper portion of the frame is a casing 4, and below this casing 4 is a casing 5, and below the casing 5 is another casing 6. All of these casings contain screens, as will be hereinafter described, and each has imparted to it a gyrating motion. The means for imparting this gyrating motion consists of a shaft 7, operated by any suitable means—such, for instance, as by means of a band connection with a pulley 8 on said shaft. The shaft 7, near its upper end, has a crank 9, with which an arm 10, extended from the end of the casing 4, connects. An arm 11, extended from the end of the casing 5, has connection with a crank 12 at about the center of the shaft 7, and the end of the casing 6 has an arm 13 connected with a crank 14 below the crank 12. These several cranks are variously projected from the shaft, so as to equalize the motion of the machine. From the opposite end of the casing 4 an arm 15 extends to a connection with a crank 16 on a shaft 17, and from the casings 5 and 6, respectively, arms 18 19 extend to cranks 20 21 on the shaft 17. The two shafts 7 and 17 have step-bearings at their lower ends in suitable blocks, and their upper ends engage in boxes secured to the upper end cross-beams 3 of the frame.

As a means for steadying the motion of the casings and also to relieve the pressure on the cranks I employ supporting-rods 22, two rods at each end of each casing and at opposite sides of the crank-arms. These supporting-rods must have a gyrating motion corresponding to that of the casings, and therefore the lower ends of the rods are seated in cup-bearings 23, secured to the frame, and the upper ends have ball-and-socket connections with brackets 24, extended outward from the casings. It will be noted that the several casings are inclined downward from their inlet ends, so that the material deposited on the screens in the casings will be moved downward to discharge, as will be hereinafter described.

In the upper portion of the casing 4 is a screen 25, consisting of wire-cloth of suitable mesh. Below the screen 25 is another screen 26 of bolting-cloth, and below this screen 26 is another screen 27, also of bolting-cloth. Between the screens 26 and 27 are two deflector-boards 28 and 29. The deflector-board 28 extends from the lower end of the screen 26 in an inclined direction to nearly the center of the screen 27. The deflector-board 29 extends from a point slightly beyond the end of the deflector-board 28 to nearly the upper end of the screen 27, and this deflector-board 29 is also inclined downward toward the upper end of the screen 27.

It may be necessary at times to cut out a portion of the screen 27. For this purpose I employ an apron 30 of flexible material—such, for instance, as canvas—and movable underneath the screen 27. As herein shown one end of this cut-out portion is attached to a roller 31, and from the other end cords or similar connections 32 extend to a take-up roller 33. Obviously by rotating the roller 33 in one direction the apron 30 may be drawn to any desired point underneath the screen 27. The rollers for manipulating this apron have outwardly-extending journals, on which are mounted hand-wheels 34 and set-nuts 35 for securing the rollers as adjusted.

As a means for cleaning the screen material 25 I employ a series of brushes designed to move with the gyratory movements of the casing, and also to have a movement relatively to the casing. As here shown, the brushes consist of bristles 36 or the like, which bear upon the screen material and are attached to straps 37 of flexible material—such, for instance, as leather. The ends of these straps are connected to the ends of the casing and are sufficiently loose to allow the brushes to play from side to side, and consequently move over a considerable surface of the screen during the movement of the casing.

In the casing 5 is a screen 38 of bolting-cloth or the like. This screen is inclined downward, and below its lower portion is a series of air-inlets 39, and also below the lower portion of this screen are outlets 40 for middlings. The walls of the air-inlets 39 have downwardly and outwardly projected flanges 41, which will prevent the middlings from going through the air-inlets 39 and will allow the air to be drawn up through the screen 38, as will be described. Above the air-inlets are air-deflector plates 42, which will deflect the air laterally in both directions, so as to spread it against the under side of the screen, and also serve as an additional means to prevent the middlings from passing through the inlets. Above the screen material, at its lower portion, and within the casing 5 is a boxing 43, within which is arranged a suction-fan 44. The shaft of this fan 44 extends upward through the top of the casing 5, and on the outer end of said shaft is a band-pulley 45, from which a band 46 extends to a band-wheel 47, eccentrically mounted on the shaft 7. The object in mounting the wheel 47 eccentrically is to allow for the gyrating motions of the casing.

Arranged in the upper portion of the casing 6 is a screen 48, with the upper surface of which brushes 49, like the brushes before described, engage. Below the screen 48 is another screen 50, the mesh of which increases in size from the upper to the lower end of the screen. The upper surface of this screen 50 is engaged by movable brushes 51, similar to the brushes before described. Inclined in opposite directions within the casing 6 and above the screen 50 are deflector-boards 52 53. The board 52 is inclined downward to the lower end of the screen 50, and the deflector board or plate 53 is inclined in the opposite direction and terminates near the upper end of the screen 50.

In operation the stock from the break-rolls of the mill is fed onto the upper end of the screen 25 through a flexible chute 54 and the gyrating motion scalps the material over the screen 25. The finer portion of this material will pass through the screen 25 and onto the screen 26. The material too large to pass through the mesh of the screen 25 will pass through the lower end thereof and discharge through a flexible spout 55. A portion of the material on the screen 26 will pass through the same onto the screen 27. The portion too coarse to pass through the mesh of the screen 26, and which is called "middlings," will pass over the end of said screen and through a flexible spout 56, which connects with the purifier-casing 5. The finished flour, which passes through the bolting-cloth 27, will fall to the bottom of the casing 4 and pass out through a spout 57 to a suitable receiver. Should it be discovered, however, that this flour contains any amount of dirt, the apron 30 may be drawn upward underneath the screen 27, so that the flour and dirt will fall thereon and pass over the end and out through a spout 58 to a suitable receiver or to a conveyer designed to carry it back to a spout 63 for a second treatment. The middlings passing over the end of the screen 27 will fall onto the upper end of the screen 38 in the purifying-casing. Of course at this time the fan 44 will be in rapid rotation. This rotation of the fan will cause a strong air-current through the mesh of the screen 38. This air-current will raise the dust or inferior material from the middlings, and this inferior material or dust will pass up through the fan and then down at the sides of the boxing 43 into a dust-chamber 59 and then out through a spout 60. The free middlings passing through the screen 38 will discharge through the openings 40 and be carried out through a spout 61, and the tailings passing over the end of the screen will pass out through a spout 62. The middlings received from the spout 61 are to be again sent to the rolls and ground, and this reground material is passed through a flexible spout 63 onto the upper end of the bolting-screen 48 in the casing 6. The material passing over the end of this screen 48 will discharge through a flexible spout 64. The flour passing through said screen will pass onto the deflector 53 and be carried to the upper end of the screen or bolting material 50. The material passing through the screen 50 is finished flour and will be discharged through the spout 65. The material too coarse, however, to pass through the meshes at the upper portion of the screen 50 will pass through the larger meshes at the lower end onto the apron 66, arranged and operated similarly to the apron 30 before described, and the material discharging off of this apron will pass out through a spout 67. This apron 66 may be drawn the full length or nearly the full length of the screen 50 should it be found that any amount of dirt remains in the flour. Then all of the material passing through the screen 50 will discharge through the spout 67 and may be again returned through the spout 63 to the screen 48. The mesh of the screen 48 at the portion above the deflector 52 is larger than the mesh above the deflector 53. Therefore the middlings will discharge through the larger mesh onto the deflector 52, and thence pass out through the spout 68 and may be again treated, if desired.

Obviously, as there are several screens in the casings 4 and 6, the material passing through the machine will be evenly graded.

Having thus described my invention, I claim as new and desire to secure by Letters Patent—

1. In a machine of the character described, a frame, a casing mounted in the upper portion thereof, a scalping-screen in said casing, a purifying-casing below the first-named casing, a screen in the purifying-casing, a fan above said screen and mounted to rotate on a horizontal plane and means for imparting motion to said screens, substantially as specified.

2. In a machine of the character described, a frame, a casing mounted in the upper portion thereof, a scalping-screen in said casing, a purifying-casing below the first-named casing and having communication therewith, a screen in said purifying-casing, a fan mounted above said screen, a crank-shaft for imparting gyratory motion to each of the casings, and a band-wheel eccentrically mounted on said crank-shaft, from which a band is designed to extend to drive the fan, substantially as specified.

3. In a machine of the character described, a frame, two casings mounted in said frame and having a flexible-tube connection one with the other, means for imparting a gyratory motion to said casings, screens in each of the casings, a rotary fan in the lower casing and above its screen, downwardly and outwardly inclined flanges on the walls of air-inlets below the screen, and deflectors over said air-inlets, substantially as specified.

ADAM W. HAAG.

Witnesses:
IRVIN D. E. SWARTZ,
CHAS. A. Z. GRIESEMER.